United States Patent
Tuttle

(10) Patent No.: US 9,889,457 B1
(45) Date of Patent: Feb. 13, 2018

(54) APPLICATOR FOR DISPENSING GARDENING LIQUIDS

(71) Applicant: John Tuttle, Tieton, WA (US)

(72) Inventor: John Tuttle, Tieton, WA (US)

( * ) Notice: Subject to any disclaimer, the term of this patent is extended or adjusted under 35 U.S.C. 154(b) by 161 days.

(21) Appl. No.: 15/054,511

(22) Filed: Feb. 26, 2016

(51) Int. Cl.
| | |
|---|---|
| *B05B 15/06* | (2006.01) |
| *B05B 9/08* | (2006.01) |
| *A01C 23/04* | (2006.01) |
| *A01M 7/00* | (2006.01) |
| *B05B 11/00* | (2006.01) |
| *B05B 15/00* | (2006.01) |
| *B05B 7/24* | (2006.01) |

(52) U.S. Cl.
CPC .......... *B05B 9/0861* (2013.01); *A01C 23/047* (2013.01); *A01M 7/0046* (2013.01); *B05B 7/2408* (2013.01); *B05B 9/0855* (2013.01); *B05B 11/3011* (2013.01); *B05B 15/00* (2013.01); *B05B 15/061* (2013.01)

(58) Field of Classification Search
CPC ..... B05B 9/0861; B05B 15/061; B05B 15/00; B05B 9/0835; B05B 11/3011; B05B 7/2408; B05B 9/0855; B05B 7/24085; A01C 23/047; A01M 7/0046
USPC ....... 239/271, 289, 332, 333, 282, 379, 390, 239/525, 588; 111/7.1–7.4; 47/48.5
See application file for complete search history.

(56) References Cited

U.S. PATENT DOCUMENTS

| | | | | |
|---|---|---|---|---|
| 3,399,639 | A * | 9/1968 | Enblom | A01G 29/00 239/333 |
| 4,872,411 | A * | 10/1989 | Nagy | A01C 23/026 239/271 |
| 5,287,994 | A * | 2/1994 | Dempsey | A01G 25/00 111/7.1 |
| 5,325,626 | A * | 7/1994 | Jackson | A01M 17/002 239/271 |
| 8,438,778 | B2 * | 5/2013 | Rose | A01M 21/043 111/7.3 |

* cited by examiner

*Primary Examiner* — Steven J Ganey
(74) *Attorney, Agent, or Firm* — Michael J. Tavella

(57) ABSTRACT

A dispenser or applicator of garden liquids such as herbicides and pesticides. It is a long tube, preferably translucent, that has an applicator tip assembly at the base that dispenses a quantity of the liquid to one plant at a time in an exact spot while the user remains standing comfortably (without having to bend or stoop over). The device also has a spray nozzle so that a larger area can be sprayed, if desired. Finally, it has a top cap that has a small opening in it that allows a user to invert the device and apply the liquid to a larger area by simply moving the device around and sprinkling the liquid where desired. Because the tube is long, the user can remain standing comfortable and the liquid is dispensed at ground level. The device also comes with a small mounting bracket for securing it on a wall.

19 Claims, 13 Drawing Sheets

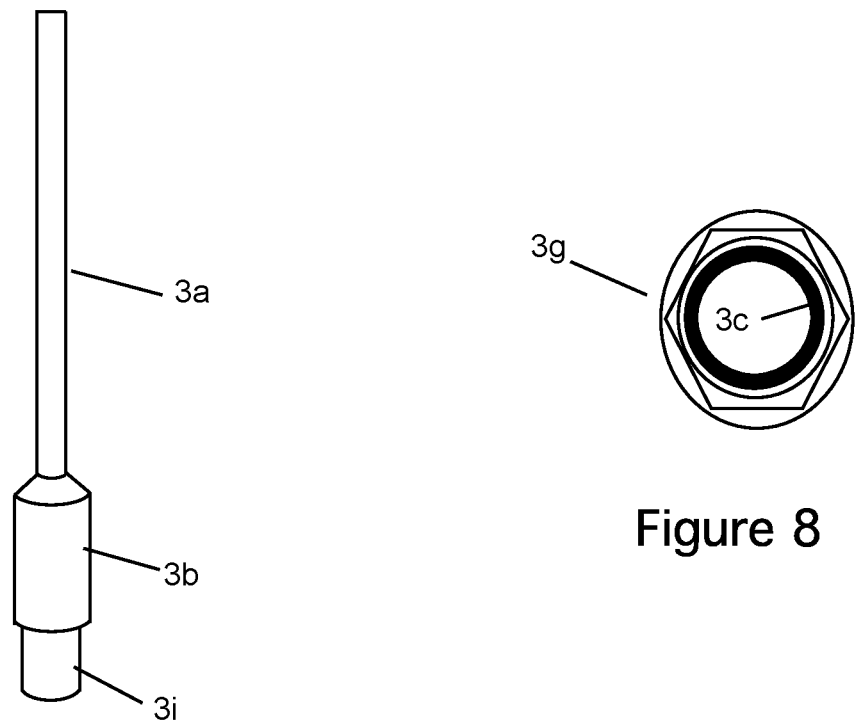
Figure 7
Figure 8
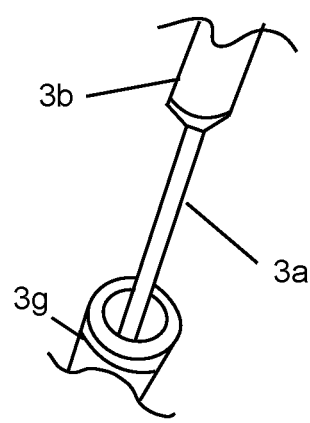
Figure 9

APPLICATOR FOR DISPENSING GARDENING LIQUIDS

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to applicators for liquids and particularly to applicators for gardening liquids.

2. Description of the Prior Art

Gardens have been around for a long time. One of the persistent problems in them is disposing of weeds and for the fertilization of the various garden plants. One method of weed removal is by hand. This is a difficult and tedious process. More modern techniques involve the use of herbicides. Today, herbicides are designed to target specific types of plants. For example, there are herbicides that attach broad leaf plants, such as clover and dandelions, but do nothing to narrow leaf plants such as lawns. Although these herbicides are effective, there remains the problem of their delivery. Some are packaged along with a lawn fertilizer, which can be applied in a pellet form over an entire lawn, or can be sprayed on using a hose. The water stream from the hose pulls the fertilizer/herbicide from the container, where it is dispensed through a nozzle. Again, this system is designed to be applied to an entire lawn.

For individual weed, there are herbicides that are sold in spray bottles that can target a single weed or a small patch of weeds. The problem with these is that the user holds the container in the user's hand, which, when the user is standing, is several feet above the level of the ground. This is no problem for one or two weeds, but if the user applies the product to several weeds, over a large area, fatigue will set in, often causing the user to quit the job before it is finished. Another problem with these applicators is that the quantity of herbicide tends to be small and the price tends to be high. Although a user can buy herbicide in larger bottles, it has to be transferred into the small bottle, which can be difficult.

Moreover, there is no product available that allows a user to apply liquid fertilizer to a single plant, if desired.

What is needed is a device that allows a user to easily target plants for disposal or feeding and has options for spraying an larger area or for other dispersal and is large enough to hold a reasonable amount of herbicide/fertilizer and which can be easily refilled from a large volume container.

BRIEF DESCRIPTION OF THE INVENTION

The instant invention overcomes these difficulties. It is a dispenser or applicator of garden liquids such as herbicides and pesticides. It is a long tube, preferably translucent, that holds a sizable volume of liquid. It has a needle valve dispenser at the base that allows a user to dispense a quantity of the liquid to one plant at a time in an exact spot while the user remains standing comfortably (without having to bend or stoop over). Because of the needle action, the device can be used on a windy day, as the liquid is not sprayed into the air. The device also has a spray nozzle so that a larger area can be sprayed, if desired. Finally, it has a top cap that has a small opening in it that allows a user to invert the device and apply the liquid to a larger area by simply moving the device around and sprinkling the liquid where desired. Again, because the tube is long, the user can remain standing comfortable and the liquid is dispensed at ground level.

The device has a small mounting bracket for securing it vertically on a wall. This not only stores the device in a convenient location, it also allows a user to fill the device by simply opening the top, placing a funnel in the open top and pouring the desired liquid into the container. With the translucent tube, the user can easily tell when the device is full, thus avoiding overfilling and possible spills. The user then simply replaces the cap and the device is ready for the next use.

It is an object of the invention to provide a device that allows a user to easily target plants for disposal or feeding.

It is another object of the invention to provide a device that has options for spraying a larger area if desired.

It is yet another object of the invention to provide a device that holds a reasonable amount of herbicide/fertilizer for repeated applications.

It is yet another object of the invention to provide a device that can be easily refilled from a large volume container.

BRIEF DESCRIPTION OF THE DRAWINGS

FIG. 7 is a side detail view of the actuator tip and the valve.

FIG. 8 is a detail view of the optional o-ring installed in the dispensing chamber.

FIG. 9 is a detail view of the actuator and valve being inserted into the dispensing chamber.

DETAILED DESCRIPTION OF THE INVENTION

Figure 1:
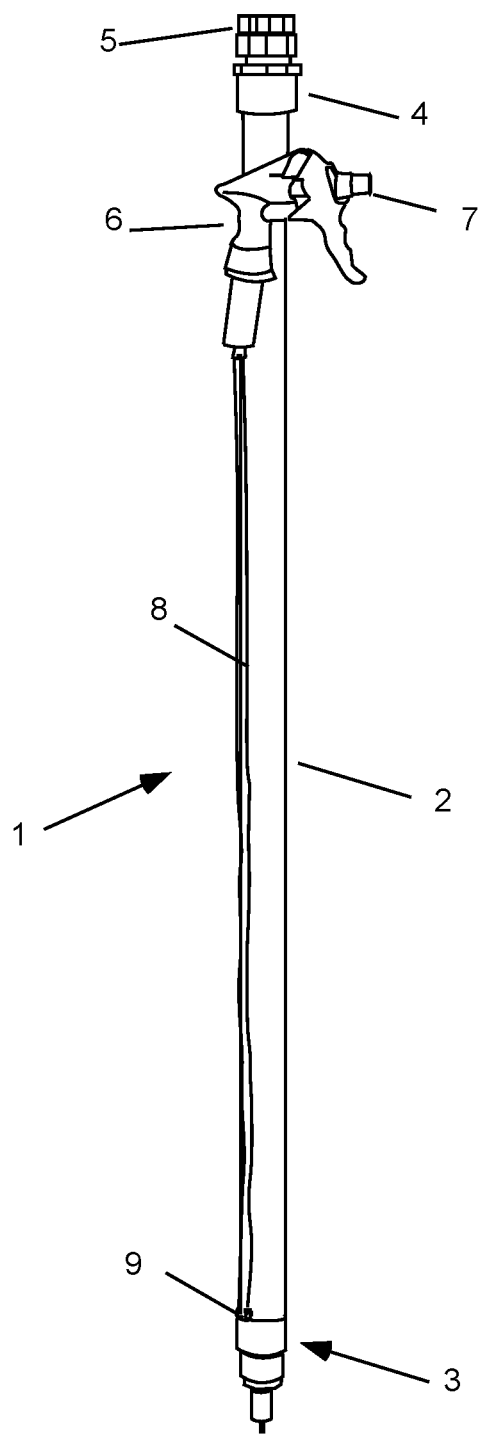
FIG. 1 is a side view of the invention.

Referring now to FIG. 1, a side view of the invention 1 is shown. The invention has a long tube 2 that holds the liquid to be dispensed. This liquid can be a weed killer, for example or a fertilizer product, or any other garden related liquid that can be dispensed using this tool. In the preferred embodiment, the tube 2 is made of translucent material; however, it can be made of any lightweight material that is impervious to the liquids being dispensed. The translucent material is preferred because it allows a user to see the level of liquid in the tube, which aids in filling the tube as this reduces or eliminated overfilling and spilling of the liquid.

At the bottom of the tube 2 is an applicator tip assembly 3. This assembly is used to dispense liquid by tapping the device on the ground, which opens the valve (as discussed below) to allow the liquid to flow from the tip.

At the top of the tube 2 is a reservoir fitting 4 that is glued to the tube. This fitting is threaded to accept a cap 5. As discussed below, the cap 5 has an opening in it that has a dual function: first, to allow a user to sprinkle the liquid over a larger area and second to act as a reservoir air inlet.

A third dispensing option is a sprayer 6. This nozzle is held on the side of the tube 2 with a snap (see FIG. 3). The sprayer 6 has a nozzle 7 that allows a user to spray a larger area, if desired. The nozzle 7 can be turned to an "off" position, when the sprayer is not needed, or an "on position" for use. The sprayer 6 obtains liquid through a small hose 8 that is secured to the tube by a connector. In the preferred embodiment, the connector is a brass elbow 9, as discussed below.

Figure 2:
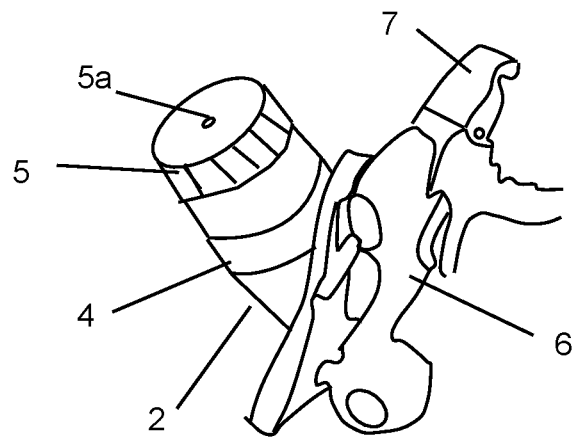
FIG. 2 is a detail view of the top cap of the invention.

FIG. 2 is a detail view of the top cap 5 of the invention. As noted above, the top cap 5 has a small hole 5a in it that allows the user to invert the tube 2 and move the device about to shake the liquid from the tube out of the hole 5a. Note the spray nozzle 7 has to be in the "off" position during this operation.

Figure 3:
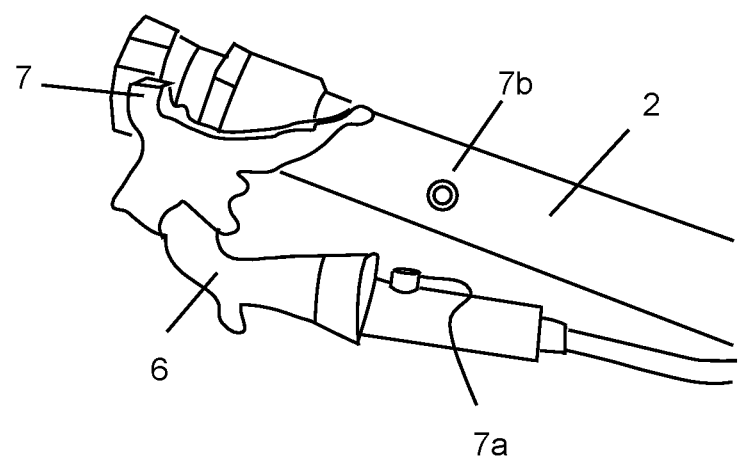
FIG. 3 is a detail view of the snap that secures the spray nozzle to the tube.

FIG. 3 is a detail view of the snap that secures the sprayer 6 to the tube 2. In this figure sprayer 6 has a snap portion 7a and the tube 2 has a snap portion 7b. When the sprayer 6 is not needed it is secured to the tube 2 by the snaps 7a and 7b. Note this figure shows a portion of the hose 8 too. Note that the snap portions 7a and 7b are considered to be a means for securing the sprayer to the tube. Of course, other equivalent fasteners may also be used, such as hook and loop type fasteners, and a stud and bracket to name two.

Figure 4:
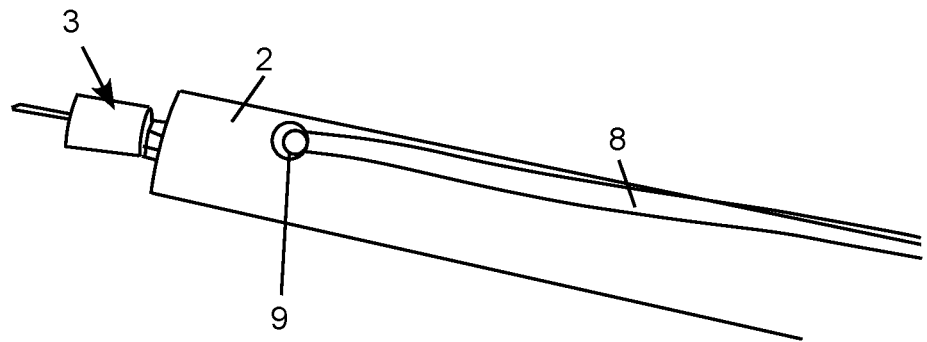
FIG. 4 is a detail view of the lower portion of the device showing the applicator tip assembly of the invention.

FIG. 4 is a detail view of the lower portion of the device showing the applicator tip assembly of the invention. Here, the applicator tip assembly 3 is shown in place in the tube 2. Note too, the bottom of the tube 8, which feeds the sprayer 6. The hose 8 attached to a brass elbow 9, which connects it to the tube 2.

Figure 5:
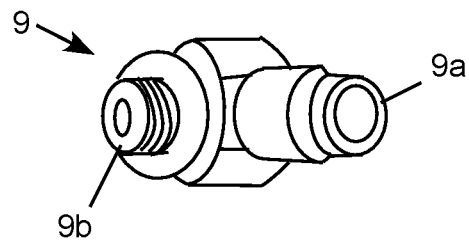
FIG. 5 is a detail view of the brass elbow that secures the hose for the sprayer to the tube.

FIG. 5 is a detail view of the brass elbow 9 that secures the hose 8 for the sprayer 6, to the tube 2. The brass elbow has hose connection portion 9a and a threaded mounting portion 9b, which threads into the side of the tube 2.

Figure 6:
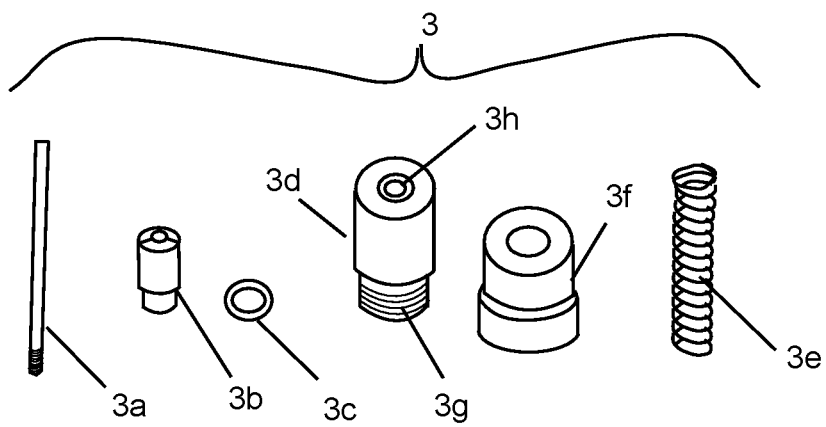
FIG. 6 is a detail view of the components of the applicator tip assembly of the invention.

FIG. 6 is a detail view of the components of the applicator tip assembly 3 of the invention. This assembly is made up of 5 or 6 parts, depending on whether the optional o-ring 3c is used. The components are: an actuator tip 3a, a valve 3b an o-ring 3c, which is optional, a dispensing chamber 3d, a spring 3e, and an adapter 3f.

FIG. 7 is a side detail view of the actuator tip 3a and the valve 3b. Note that the actuator tip 3a screws onto the valve 3b as shown.

FIG. 8 is a detail view of the optional o-ring installed in the dispensing chamber 3d. At the bottom of the dispensing chamber is a threaded portion 3g, which is shown in the figure. The optional o-ring 3c is inserted in this portion of the dispensing chamber.

FIG. 9 is a detail view of the actuator 3a and valve 3b being inserted into the dispensing chamber's threaded portion 3g. In this view, the actuator is slid through the dispensing chamber and exits the hole 3h of the dispensing chamber (see FIG. 6). The valve 3b is pushed down until it presses the o-ring 3c into the bottom of the threaded portion 3g of the dispensing chamber. Note that the actuator, valve and spring are part of a means for dispensing a quantity of a liquid from said hollow tube.

Figure 10:
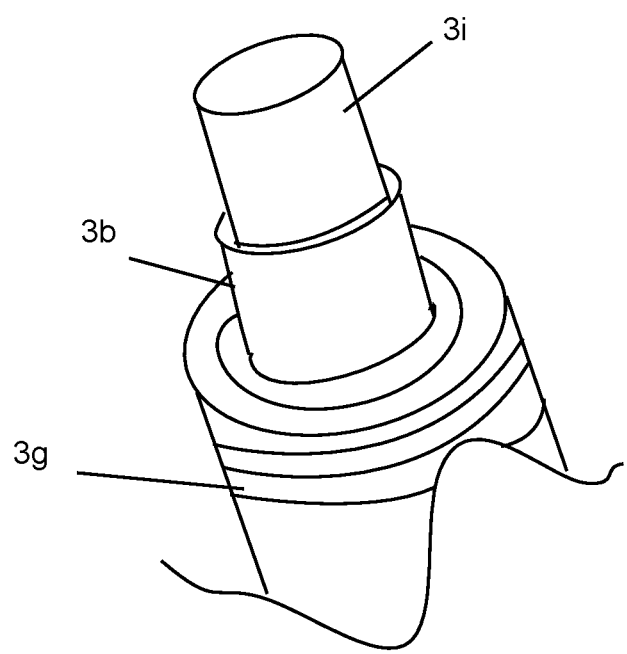
FIG. 10 is a detail view of the valve after insertion into the dispensing chamber.

FIG. 10 is a detail view of the valve 3b after insertion into the dispensing chamber 3d. As noted above, the valve is seated into the dispensing chamber as shown. Note that the end of the valve 3i remains protruding from the dispensing chamber.

Figure 11:
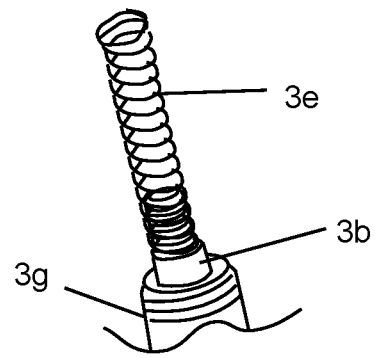
FIG. 11 is a detail view of the valve with the spring in position.

FIG. 11 is a detail view of the valve 3i with the spring 3e in position. The spring 3e is fitted over the end 3i of the valve as shown.

Figure 12:
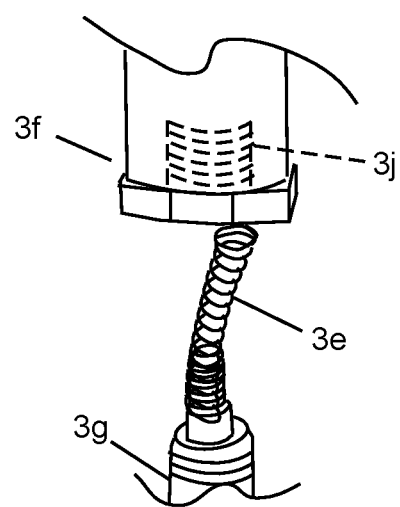
FIG. 12 is a detail view of the valve and spring being inserted into the valve retainer piece.

FIG. 12 is a detail view of the valve and spring being inserted into the valve retainer piece. Once the spring 3e is placed on the valve 3b, the sub assembly is placed into the adapter 3f, which has internal threads 3j formed in it. This allows the adapter to be screwed onto the threaded portion 3g of the dispensing chamber 3d.

Figure 13:
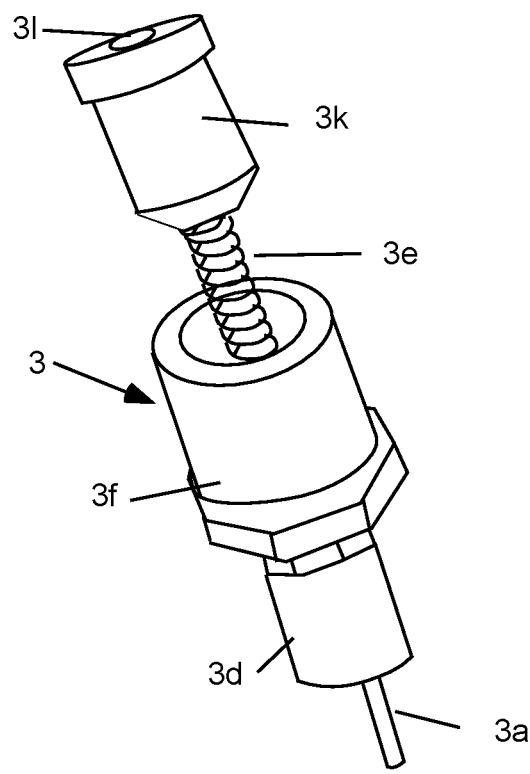
FIG. 13 is a detail view of the inlet port being inserted into the valve retainer piece.
Figure 14:
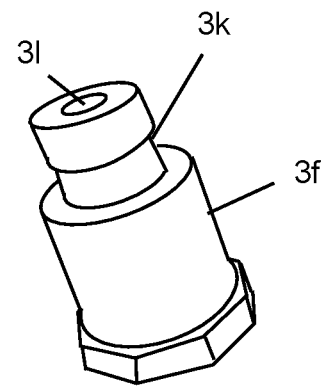
FIG. 14 is a detail view of the inlet port and valve retainer piece fully assembled.
Figure 15:
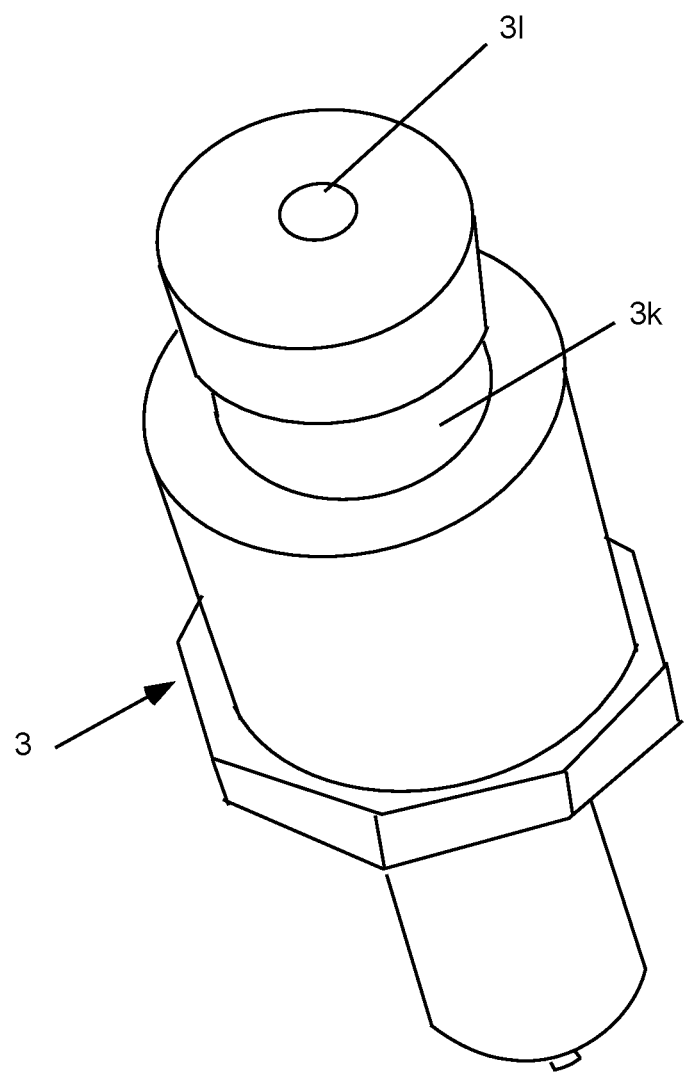
FIG. 15 is a top perspective view of the fully assembled applicator tip assembly.

FIG. 13 is a detail view of the inlet port being inserted into the valve retainer piece. Here, the adapter 3f is fully screwed onto the threaded portion 3g of the dispensing chamber 3d. The assembly 3 is capped with an inlet port 3k that has a hole to accept the spring 3e as shown and a hole 3l on top to permit the liquid in the tube to flow through the assembly 3. The inlet port 3k is placed over the spring and is pressed into the adapter until it is fully seated, as shown in FIG. 14. FIG. 15 is a top perspective view of the fully assembled applicator tip assembly. Here, the inlet port 3k is shown and the hole 3l clearly shown.

Figure 16:
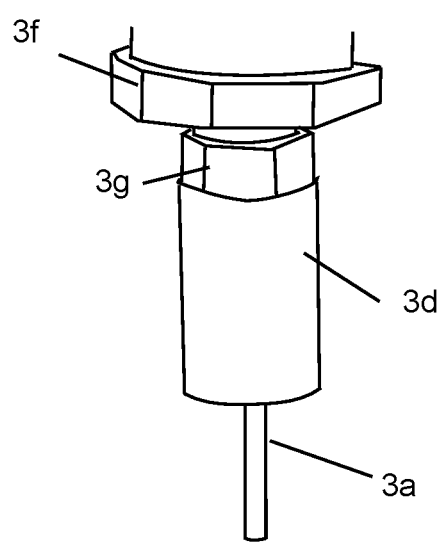
FIG. 16 is a detail view showing the fully assembled applicator tip assembly with the actuator out and the valve closed.

FIG. 16 is a detail view showing the fully assembled applicator tip assembly with the actuator out and the valve closed. In this position, no liquid escapes the applicator tip assembly 3.

Figure 17:
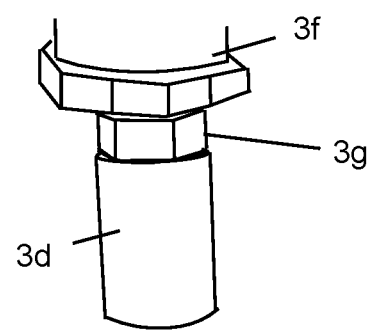
FIG. 17 is a detail view showing the fully assembled applicator tip assembly with the actuator depressed and the valve open.

FIG. 17 is a detail view showing the fully assembled applicator tip assembly 3 with the actuator 3a depressed and the valve open. To use the device using the applicator tip assembly, the user presses the device to the ground, which causes the actuator to be pushed up into the applicator tip assembly. This action opens the valve 3b, which then permits liquid to flow from the tube 2. This action can be a simple tap, which releases a small measured quantity of the liquid. Or, the user can hold the device down, allowing more liquid to flow. In the preferred embodiment, the applicator tip assembly is intended to be used for quick spot applications of liquid. For example a single weed in a yard might get one or two taps of the tool to dispense weed killer for that particular weed. In this way, a user can quickly and easily move across a property treating individual weeds. Similarly, the device can be used with liquid fertilizer to feed specific plants in the same way.

As noted above, the sprayer 6 can be used for larger areas as well as the sprinkler cap. Both of these options are always available as part of the device.

Figure 18:
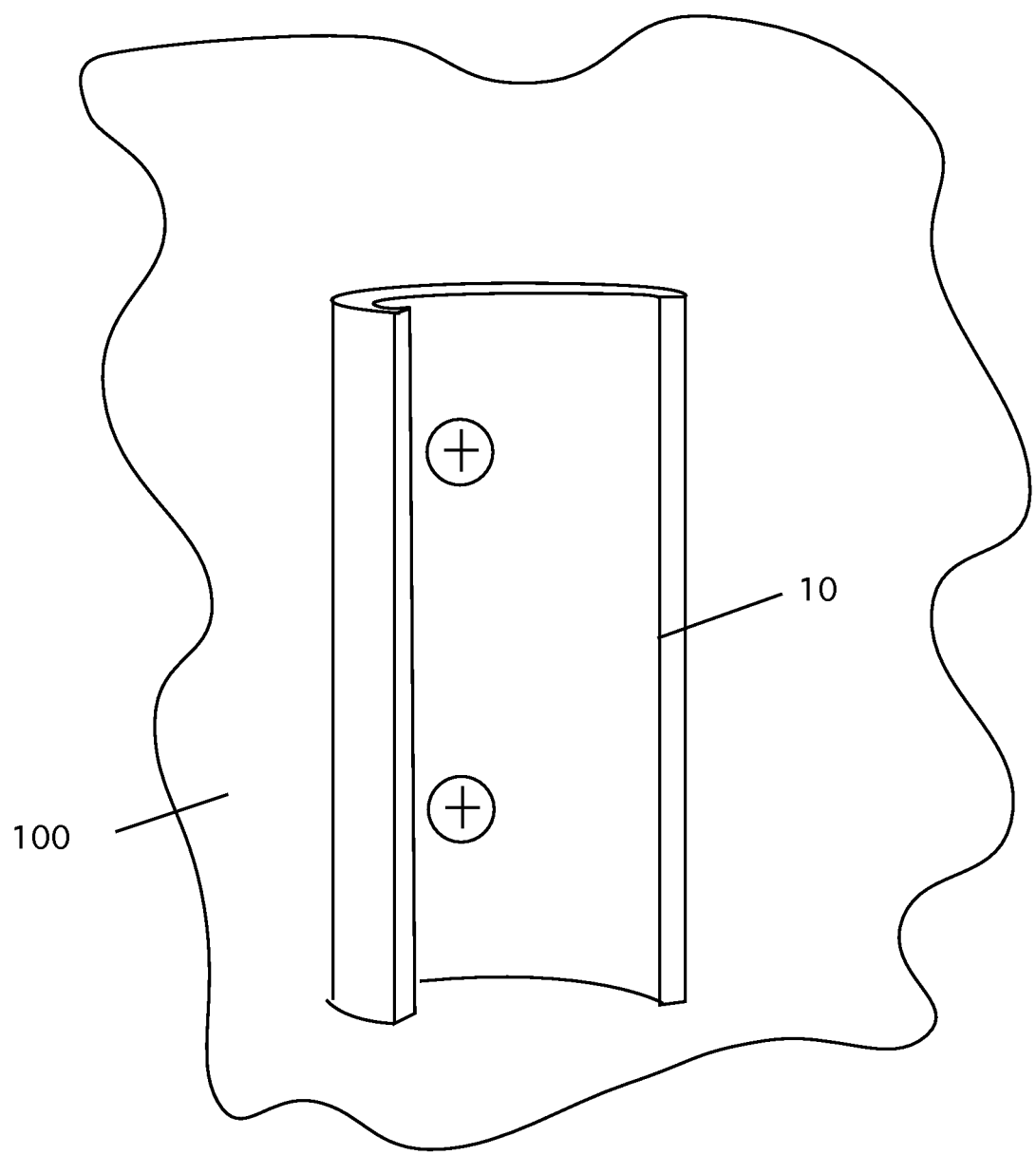
FIG. 18 is a detail view of the support bracket as mounted on a wall surface.

FIG. 18 is a detail view of the support bracket 10 as mounted on a wall surface 100. One of the unique features of the device is the mounting bracket 10 that is used to hold the device when not being used. This bracket is simply screwed to a wall 100 as shown.

Figure 19:
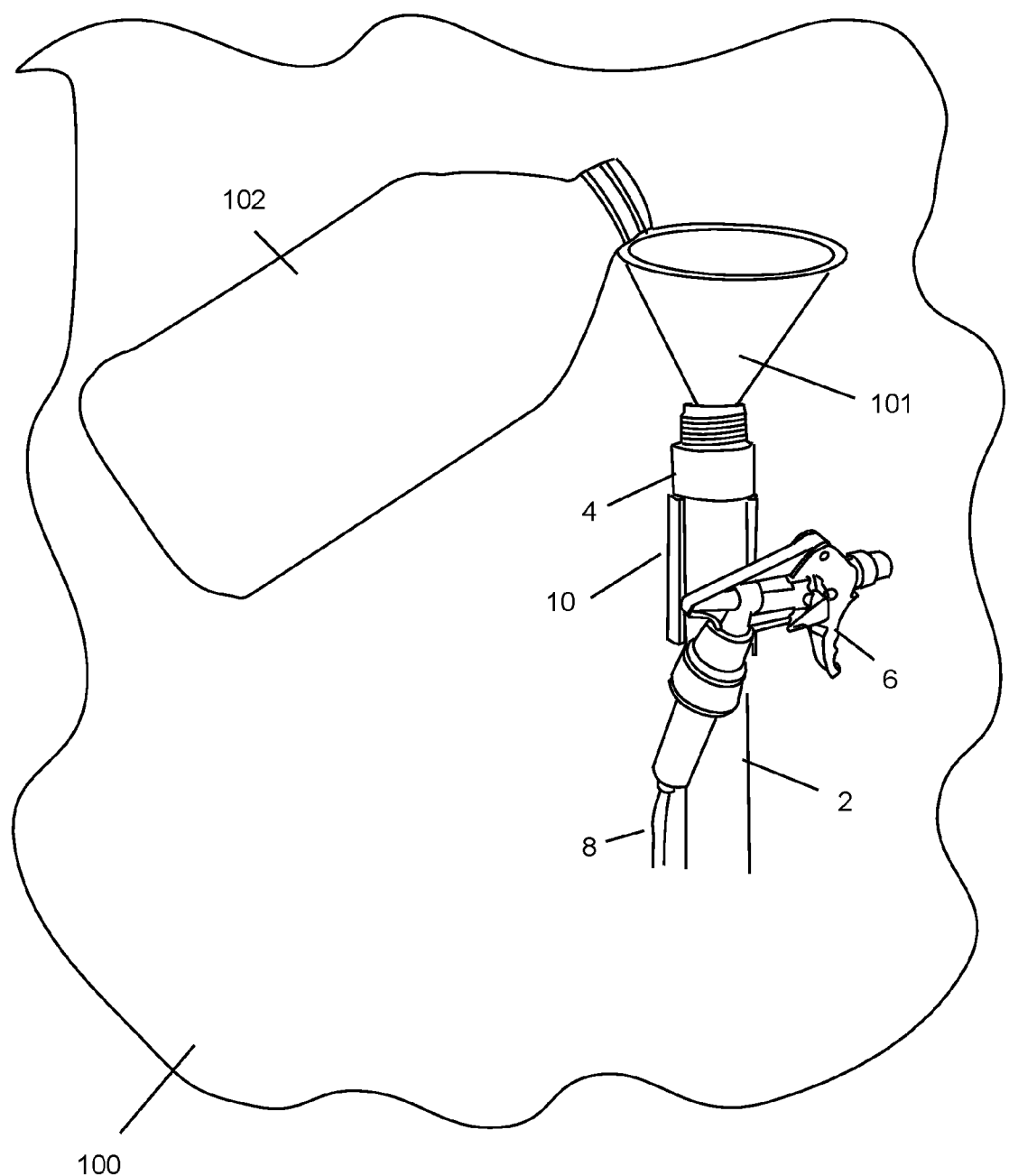
FIG. 19 is a detail view of the device installed in the support bracket showing the cap removed and the device being filled.

FIG. 19 is a detail view of the device 1 placed in the support bracket 10 showing the cap removed and the device being filled. Another feature of the bracket 10 is that the device can be supported while it is being filled. This makes filling the tube 2 easy and convenient. To fill the device, the cap is removed. Note the reservoir fitting 4 is shown. A funnel 101 is placed in the opening and a container of fluid 102 is shown ready to pour the contents into the tube 2. Once filled, the cap 5 can be replaced and the device is ready for the next use.

Figure 20:
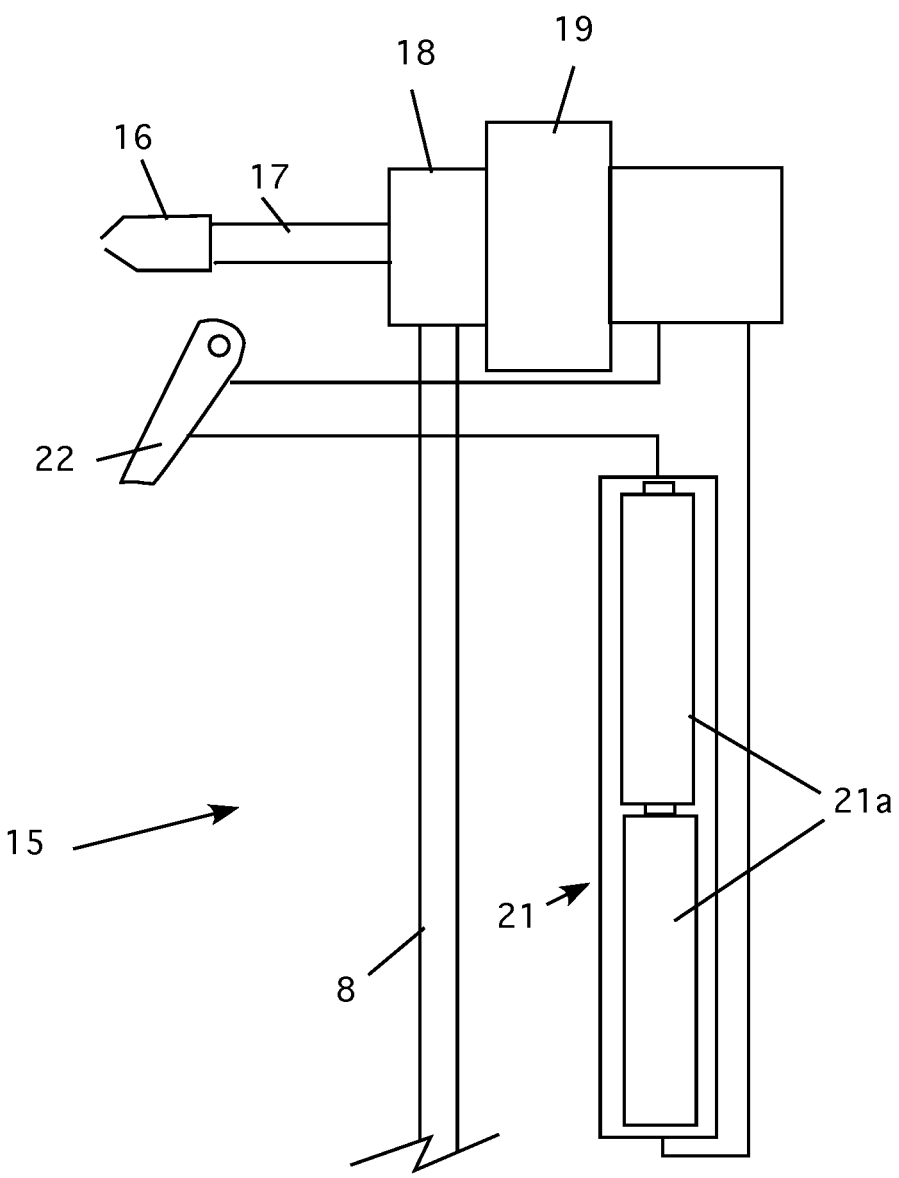
FIG. 20 is a diagrammatic view of a powered spray nozzle.

FIG. 20 is a diagrammatic view of a powered spray nozzle 15. This is an option that allows spraying over larger areas without having to constantly pump the sprayer. This sprayer has an adjustable nozzle 16 that attaches to a pump outlet tube 17, which connects to a pump 18. The pump is driven by a motor 19 that connects to a power supply 21 through a switch 22. The power supply in the preferred embodiment comprises two batteries 21a. Of course, the size of the batteries can vary, but the intent is to keep the sprayer as light as possible. The liquid to be dispensed comes from the hose 8 as before. The hose 8 connect to the inlet of the pump 18 as shown.

Figure 21:
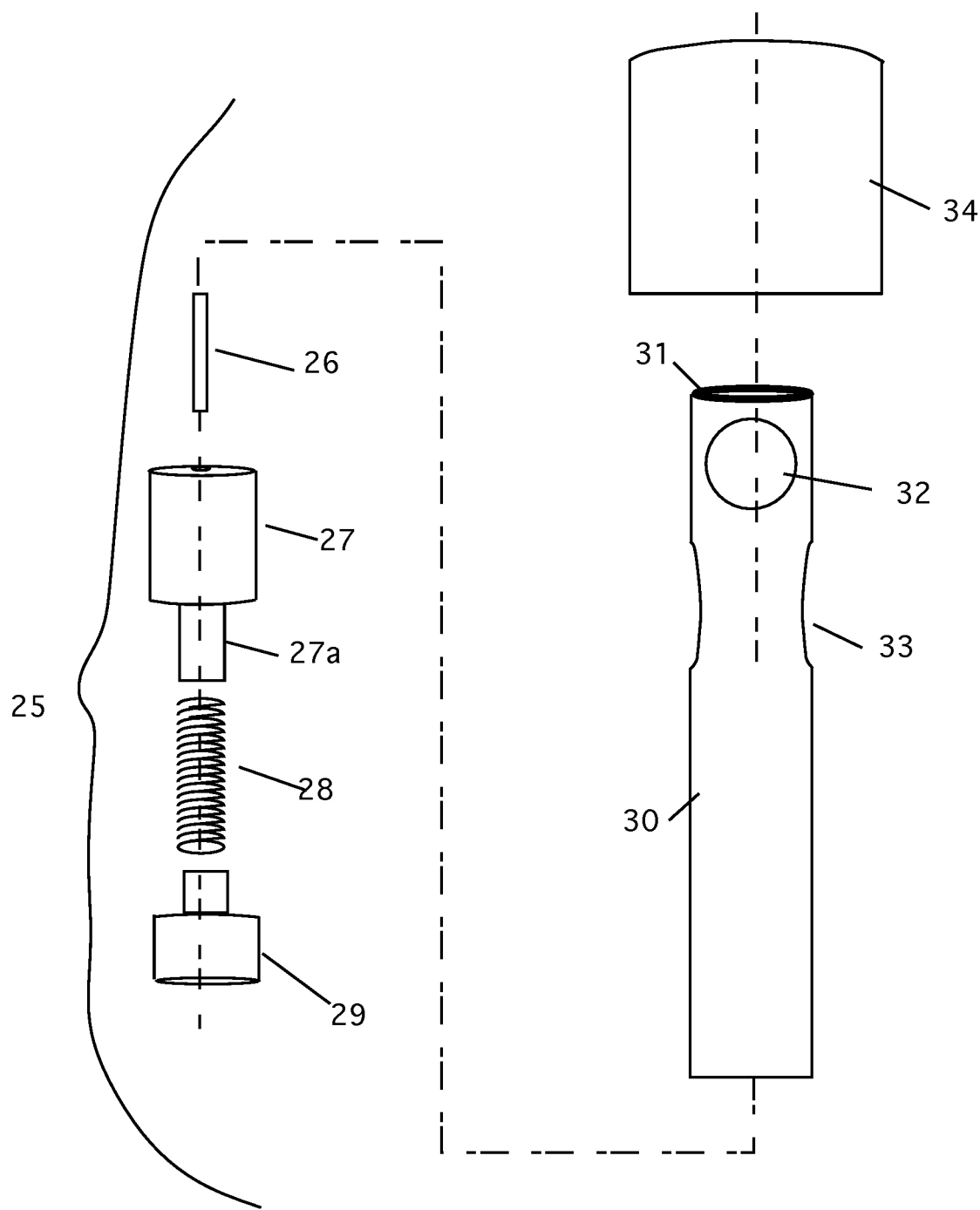
FIG. 21 is an exploded view of an alternative actuator valve assembly.

FIG. 21 is an exploded view of an alternative actuator valve assembly. Here, the alternative actuator valve assembly 25 is shown. The alternative actuator valve assembly consists of an actuator 26, which screws into a valve 27. The valve 27 has a spring seat 27a. A spring 28 is placed over the spring seat 27a. A spring retainer 29 is placed on the other end of the spring to hold it in place. Once assembled, this sub assembly is placed into a dispensing chamber 30. The dispensing chamber has a liquid inlet 32 and a pressure escape outlet 33. This escape outlet is used to release the pressure when the actuator needle is retracted into the cap. The dispensing chamber 30 has an o-ring 31 attached, which seals the end. The dispensing chamber 30 is placed in a cap 34. The cap 34 has an opening that allows the actuator to extend outwardly from the cap (see FIG. 22).

Figure 22:
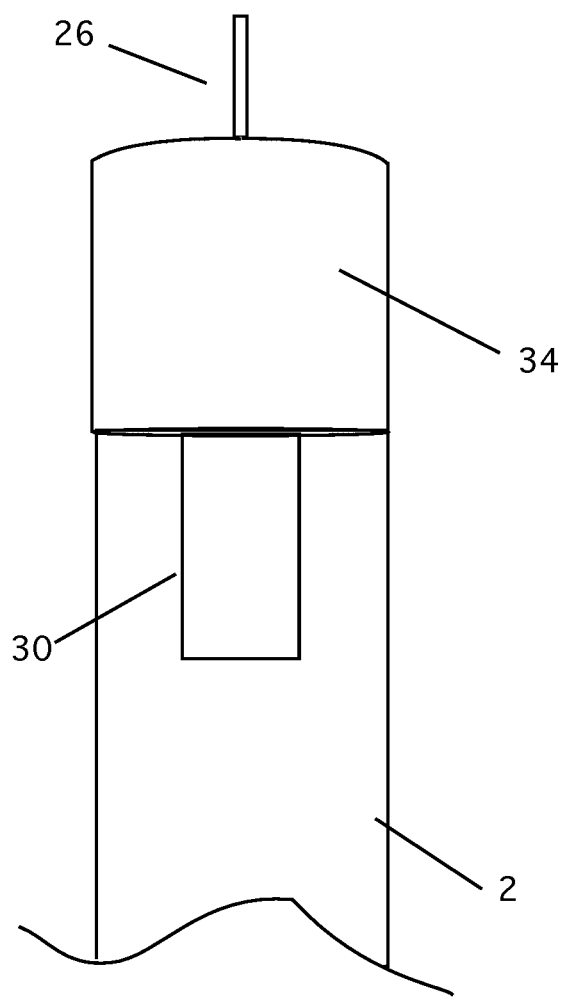
FIG. 22 is a side view of the assembled alternative actuator valve assembly installed on the tube.

FIG. 22 is a side view of the assembled alternative actuator valve assembly installed on the tube. In this view, the dispensing chamber 30 with the subassembly of the valve and actuator is shown installed in the cap 34. Note that the actuator 26 is shown extending out from the cap. Once assembled, the assembly is placed over the lower end of the tube 2. In this way, the device is then ready for use.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. An applicator for dispensing gardening liquids comprising:
   a) a hollow tube having a top end and a bottom end;
   b) an applicator tip assembly attached to the bottom end of said hollow tube, for dispensing a quantity of a liquid from said hollow tube;
   c) a sprayer;
   d) a fastener for securing the sprayer to the tube, attached to said sprayer and said tube;
   e) a hose attached to the sprayer; and
   f) a connector for attaching the hose to the hollow tube.

2. The applicator of claim 1 further comprising a cap, secured to the top end of said hollow tube.

3. The applicator of claim 2 wherein said cap has a hole formed therein.

4. The applicator of claim 3 wherein when said hollow tube is inverted, said cap allows liquid to be sprinkled therefrom through said hole in said cap.

5. The applicator of claim 1 wherein said applicator tip assembly includes:
   a) an actuator;
   b) a valve attached to said actuator; and
   c) a spring, attached to said valve.

6. The applicator of claim 1 wherein the applicator tip assembly comprises:
   a) an actuator;
   b) a valve, attached to said actuator;
   c) a dispensing chamber, attached to said valve;
   d) a spring, attached to said valve; and
   e) an inlet port attached to said spring.

7. The applicator of claim 6 wherein the applicator tip assembly further comprises:
   a) a valve retainer piece, screwed onto said dispensing chamber, and further wherein said inlet port is secured into said valve retainer piece.

8. The applicator of claim 6 wherein the inlet port has a hole formed therein to permit the flow of liquid therethrough.

9. The applicator of claim 6 wherein said applicator tip assembly has an off position wherein said actuator is extended outwardly from said applicator tip assembly, and an on position wherein said actuator is retracted into said applicator tip assembly.

10. The applicator of claim 1 wherein said hollow tube is transparent.

11. The applicator of claim 1 wherein said hollow tube is filled with an herbicide.

12. The applicator of claim 1 wherein said hollow tube is filled with a fertilizer.

13. The applicator of claim 1 wherein the sprayer has a spray nozzle.

14. The applicator of claim 13 wherein the spray nozzle has an on position and an off position.

15. The applicator of claim 1 further comprising a bracket for mounting said applicator to a wall.

16. The applicator of claim 1 wherein the connector for attaching the hose to the hollow tube comprises an elbow fitting.

17. The applicator of claim 16 wherein the elbow fitting is made of brass.

18. The applicator of claim 1 wherein the sprayer further includes:
   a) a pump;
   b) a motor to drive said pump;
   c) a power supply used to power said motor;
   d) a switch to operate said motor;
   e) a nozzle; and f) a pump outlet tube, extending from said pump to said nozzle.

19. The applicator of claim 1 wherein the applicator tip assembly comprises:
  a) an actuator;
  b) a valve, attached to said actuator;
  c) a spring, attached to said valve;
  d) a spring retainer, attached to said spring;
  e) wherein the actuator, valve, spring and spring retainer form a subassembly;
  f) a dispensing chamber, having an inlet and a pressure escape portion;
  g) wherein said subassembly is inserted into said dispensing chamber;
  h) an o-ring, attached to said dispensing chamber; and
  i) a cap, into which said dispensing chamber and said subassembly is placed such that said actuator extends outward from said cap.

\* \* \* \* \*